(12) United States Patent
Onomura et al.

(10) Patent No.: US 11,061,049 B2
(45) Date of Patent: Jul. 13, 2021

(54) FLYING OBJECT POSITION MEASURING APPARATUS, FLYING OBJECT POSITION MEASURING METHOD, AND NON-TRANSITORY STORAGE MEDIUM

(71) Applicant: SUBARU CORPORATION, Tokyo (JP)

(72) Inventors: Yoichi Onomura, Tokyo (JP); Takashi Nagayama, Tokyo (JP); Takeshi Kibayashi, Tokyo (JP); Akihiro Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 516 days.

(21) Appl. No.: 15/845,495

(22) Filed: Dec. 18, 2017

(65) Prior Publication Data
US 2018/0203031 A1    Jul. 19, 2018

(30) Foreign Application Priority Data
Jan. 13, 2017    (JP) .............................. JP2017-004021

(51) Int. Cl.
*G01C 3/08*    (2006.01)
*G01P 13/02*    (2006.01)
(Continued)

(52) U.S. Cl.
CPC ............ *G01P 13/025* (2013.01); *G06T 7/246* (2017.01); *G06T 7/70* (2017.01); *G06T 7/73* (2017.01);
(Continued)

(58) Field of Classification Search
CPC ........ G01P 13/025; G01P 3/685; G06T 7/246; G06T 7/73; G06T 7/70; G06T 2207/10016; G06T 2207/30241; G06T 2207/30261
See application file for complete search history.

(56) References Cited

U.S. PATENT DOCUMENTS

| 6,419,262 B1 | 7/2002 | Fendt et al. |
| 9,272,684 B1 | 3/2016 | Keyser et al. |

(Continued)

FOREIGN PATENT DOCUMENTS

| JP | 47-024736 U | 11/1972 |
| JP | 3001757 B2 | 1/2000 |

(Continued)

OTHER PUBLICATIONS

Japanese Notice of Reasons for Refusal issued in corresponding Japanese Patent Application No. 2018-020257, dated Sep. 3, 2019, with English translation.

*Primary Examiner* — Samantha K Abraham
(74) *Attorney, Agent, or Firm* — McDermott Will & Emery LLP (57) ABSTRACT

A flying object position measuring apparatus includes an optical sensor, a storage, an orientation calculator, and a position calculator. The optical sensor obtains an image of a flying object. The flying object performs flight along a ballistic trajectory. The storage stores, in advance, basic trajectory information regarding a basic trajectory of the flying object. The basic trajectory information includes position information of a start point at which the flying object starts the flight. The orientation calculator calculates an orientation of the flying object as viewed from the optical sensor on the basis of the image obtained by the optical sensor. The position calculator calculates, as a position of the flying object, an intersection of a plane of rotation with the
(Continued)

orientation of the flying object. The plane of rotation is a plane based on a rotation of the basic trajectory around a vertical axis that travels through the start point.

15 Claims, 5 Drawing Sheets

(51) Int. Cl.
  *G06T 7/70* (2017.01)
  *G06T 7/246* (2017.01)
  *G06T 7/73* (2017.01)
  *G01P 3/68* (2006.01)
(52) U.S. Cl.
  CPC .... *G01P 3/685* (2013.01); *G06T 2207/10016* (2013.01); *G06T 2207/30241* (2013.01); *G06T 2207/30261* (2013.01)

(56) References Cited

U.S. PATENT DOCUMENTS

| | | | |
|---|---|---|---|
| 2011/0261193 A1* | 10/2011 | Agurok | F41H 13/00 348/135 |
| 2015/0307055 A1 | 10/2015 | Cheng et al. | |
| 2016/0306036 A1* | 10/2016 | Johnson | G01S 13/867 |
| 2017/0101071 A1 | 4/2017 | Kruse | |
| 2018/0290616 A1 | 10/2018 | Nakajima et al. | |
| 2018/0354447 A1 | 12/2018 | Nakajima et al. | |

FOREIGN PATENT DOCUMENTS

| | | |
|---|---|---|
| JP | 2015-093603 A | 5/2015 |
| WO | 2017/061163 A1 | 4/2017 |
| WO | 2017/090772 A1 | 6/2017 |

\* cited by examiner

FLYING OBJECT POSITION MEASURING APPARATUS, FLYING OBJECT POSITION MEASURING METHOD, AND NON-TRANSITORY STORAGE MEDIUM

CROSS-REFERENCE TO RELATED APPLICATIONS

The present application claims priority from Japanese Patent Application No. 2017-004021 filed on Jan. 13, 2017, the entire contents of which are hereby incorporated by reference.

BACKGROUND

The technology relates to a technique that measures a position of a flying object.

An existing method of measuring a position of a flying object such as a rocket typically uses a radar device. Such a method using the radar device has a concern that a position of a person who performs the measurement is easily detected by others due to output of radio waves by the radar device.

To address the foregoing concern, a method that uses an optical sensor without relying on the use of the radar device has been disclosed, for example, in Japanese Patent (JP-B) No. 3001757.

SUMMARY

A technique of measuring a position of a flying object by means of an optical sensor, such as that disclosed in JP-B No. 3001757, is complex in configuration and involves difficulty in achieving higher accuracy.

It is desirable to provide a flying object position measuring apparatus, a flying object position measuring method, and a non-transitory storage medium containing a flying object position measuring program that each allow for highly-accurate measurement of a position of a flying object with a simple configuration.

An aspect of the technology provides a flying object position measuring apparatus including an optical sensor, a storage, an orientation calculator, and a position calculator. The optical sensor is configured to obtain an image of a flying object. The flying object is configured to perform flight along a ballistic trajectory. The storage stores, in advance, basic trajectory information regarding a basic trajectory of the flying object. The basic trajectory information includes position information of a start point at which the flying object starts the flight. The orientation calculator is configured to calculate an orientation of the flying object as viewed from the optical sensor on the basis of the image obtained by the optical sensor. The position calculator is configured to calculate, as a position of the flying object, an intersection of a plane of rotation with the orientation of the flying object. The plane of rotation is a plane based on a rotation of the basic trajectory around a vertical axis. The vertical axis travels through the start point.

An aspect of the technology provides a flying object position measuring method including: calculating an orientation of a flying object as viewed from an optical sensor on the basis of an image, of the flying object, obtained by the optical sensor, the flying object performing flight along a ballistic trajectory; and calculating, as a position of the flying object, an intersection of a plane of rotation with the orientation of the flying object, the plane of rotation being a plane based on a rotation of a basic trajectory of the flying object around a vertical axis, the vertical axis traveling through a start point, the start point being a point at which the flying object starts the flight, the basic trajectory including position information of the start point.

An aspect of the technology provides a non-transitory storage medium containing a flying object position measuring program embodied therein. The flying object position measuring program causes, when executed by a computer, the computer to implement a method. The method includes: calculating an orientation of a flying object as viewed from an optical sensor on the basis of an image, of the flying object, obtained by the optical sensor, the flying object performing flight along a ballistic trajectory; and calculating, as a position of the flying object, an intersection of a plane of rotation with the orientation of the flying object, the plane of rotation being a plane based on a rotation of a basic trajectory of the flying object around a vertical axis, the vertical axis traveling through a start point, the start point being a point at which the flying object starts the flight.

An aspect of the technology provides a flying object position measuring apparatus including an optical sensor, a storage, and circuitry. The optical sensor is configured to obtain an image of a flying object. The flying object is configured to perform flight along a ballistic trajectory. The storage stores, in advance, basic trajectory information regarding a basic trajectory of the flying object. The basic trajectory information includes position information of a start point at which the flying object starts the flight. The circuitry is configured to calculate an orientation of the flying object as viewed from the optical sensor on the basis of the image obtained by the optical sensor. Further, the circuitry is configured to calculate, as a position of the flying object, an intersection of a plane of rotation with the orientation of the flying object. The plane of rotation is a plane based on a rotation of the basic trajectory around a vertical axis. The vertical axis travels through the start point.

DETAILED DESCRIPTION

In the following, some non-limiting implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

[Configuration of Flying Object Position Measuring Apparatus]

A description is given first of an example of a configuration of a flying object position measuring apparatus 1 according to one implementation of the technology.

Figure 1:
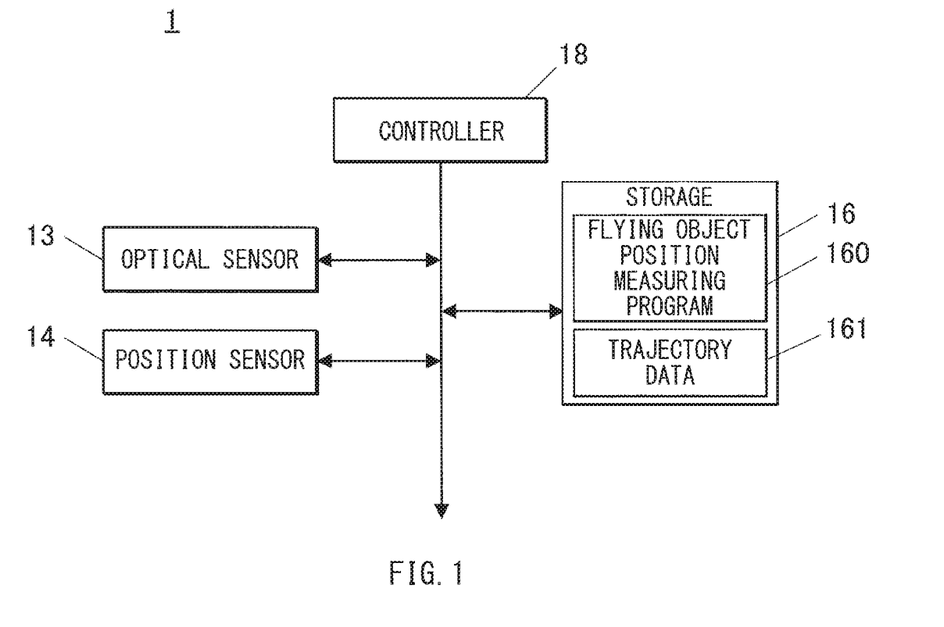
FIG. 1 is a block diagram illustrating an example of a functional configuration of a flying object position measuring apparatus according to one implementation of the technology.

FIG. 1 is a block diagram illustrating an example of a functional configuration of the flying object position measuring apparatus 1.

Figure 3A:
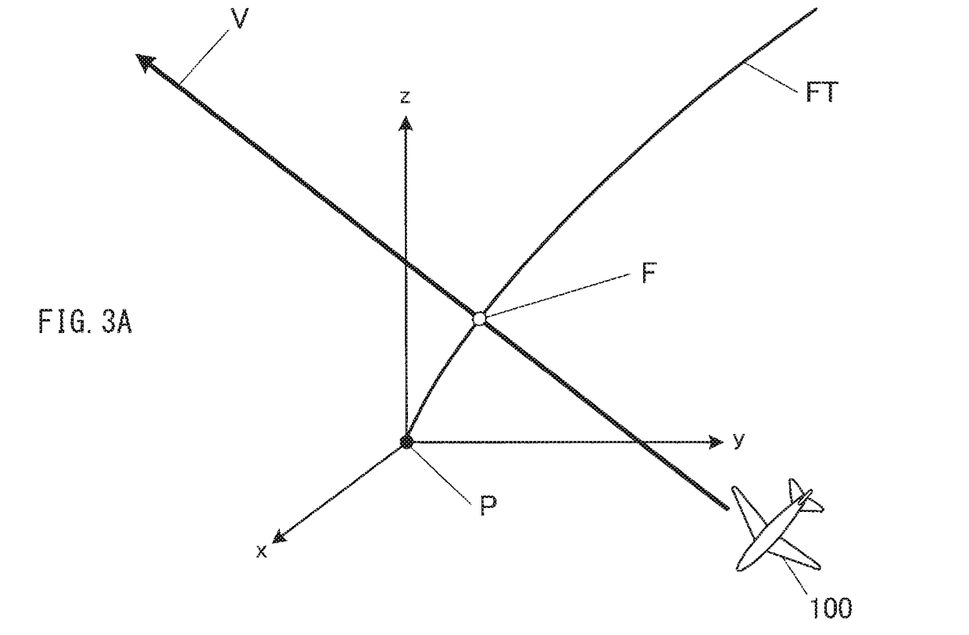
FIGS. 3A and 3B each describe an example of the flying object position measuring process according to one implementation of the technology.
Figure 3B:
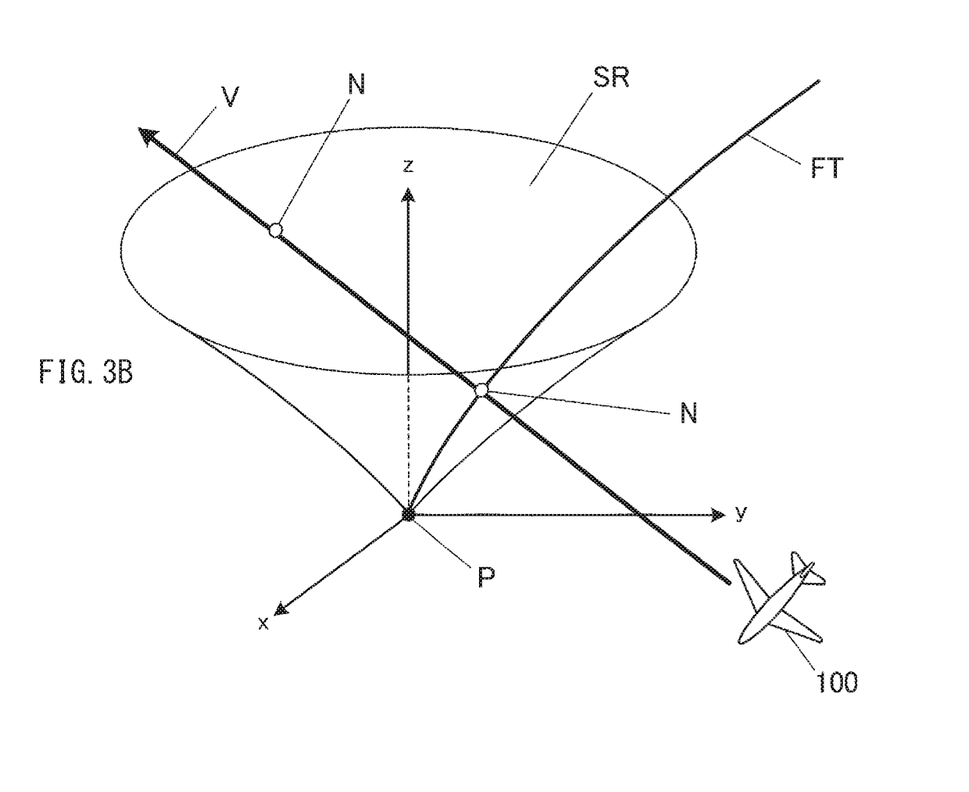

The flying object position measuring apparatus 1 may measure a position of a flying object F by means of an optical sensor. In one implementation, the flying object position measuring apparatus 1 may be mounted on an aircraft 100 as illustrated in FIG. 3 by way of example. The flying object F starts flight from a start point P, or may be launched from the start point P, and performs the flight along a ballistic trajectory. Non-limiting examples of the flying object F may include a rocket.

Referring to FIG. 1, the flying object position measuring apparatus 1 may specifically include an optical sensor 13, a position sensor 14, a storage 16, and a controller 18.

The optical sensor 13 may be an optical camera that detects and captures the flying object F and obtains an image of the flying object F. The optical sensor 13 may be able to perform continuous shooting at a predetermined frame rate. The optical sensor 13 may be so provided on a body of the aircraft 100 that a shooting direction of the optical sensor 13 is variable. In one implementation, the optical sensor 13 may be so placed on a gimbal that the shooting direction of the optical sensor 13 is variable. The optical sensor 13 may obtain the image of the flying object F and output the obtained image information to the controller 18, on the basis of a control instruction given from the controller 18.

The position sensor 14 may obtain position information, i.e., coordinate information, of the flying object position measuring apparatus 1. In one implementation, the position sensor 14 may obtain position information of the own aircraft 100. In this implementation, the position sensor 14 may obtain the position information of the aircraft 100 and output the obtained position information to the controller 18, on the basis of a control instruction given from the controller 18. The position sensor 14 is not particularly limited in its kind as long as the position sensor 14 is able to obtain the position information of the aircraft 100. In one implementation, the position sensor 14 may be any device that is free from outputting radio waves that are detectable by others. Non-limiting examples of the position sensor 14 may include a global position system (GPS) receiver and an inertial navigation system provided in the aircraft 100.

The storage 16 may be a memory that stores, for example but not limited to, a program and data that are directed to achievement of various functions of the flying object position measuring apparatus 1 and also serves as a workspace. In one implementation, the storage 16 may store a flying object position measuring program 160 and trajectory data 161 in advance.

The flying object position measuring program 160 may cause the controller 18 to execute a flying object position measuring process which will be described later.

The trajectory data 161 may be information regarding a basic trajectory FT, i.e., a ballistic trajectory, of the flying object F illustrated in FIG. 3 by way of example. The information regarding the basic trajectory FT may include position information of the start point P at which the flying object F starts the flight, as illustrated in FIG. 3 by way of example.

The controller 18 may perform a central control of each unit of the flying object position measuring apparatus 1. Specifically, the controller 18 may control operations of units such as the optical sensor 13 and the position sensor 14. Further, the controller 18 may load the program stored in the storage 16 and execute various processes in association with the loaded program. It is to be noted that the controller 18 may be provided integrally with a flight controller that controls flight of the aircraft 100. In one implementation, the controller 18 may serve as an "orientation calculator" and a "position calculator".

[Operation of Flying Object Position Measuring Apparatus]

A description is given next of an operation, of the flying object position measuring apparatus 1, that is to be performed upon execution of the flying object position measuring process.

Figure 2:
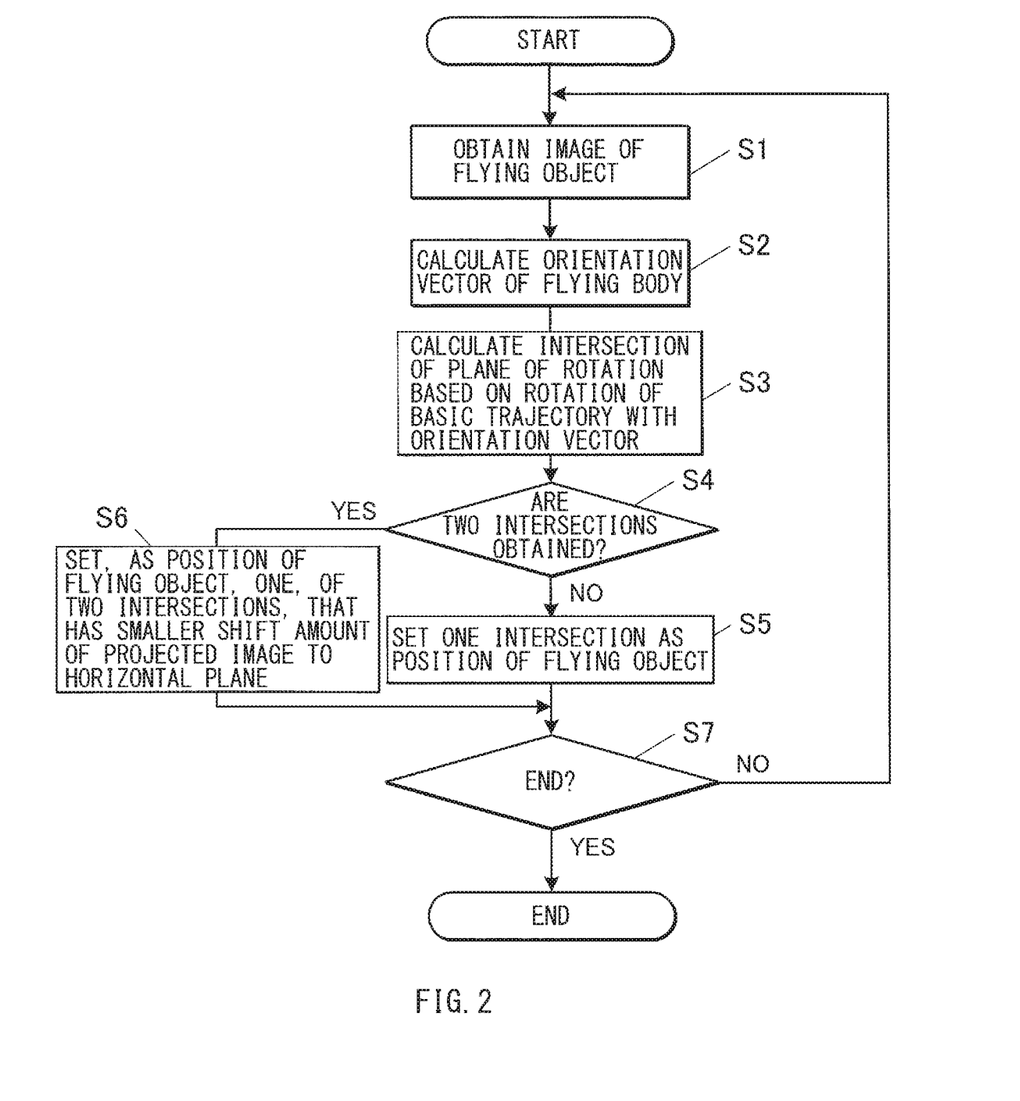
FIG. 2 is a flowchart illustrating an example of a flow of a flying object position measuring process according to one implementation of the technology.
Figure 4:
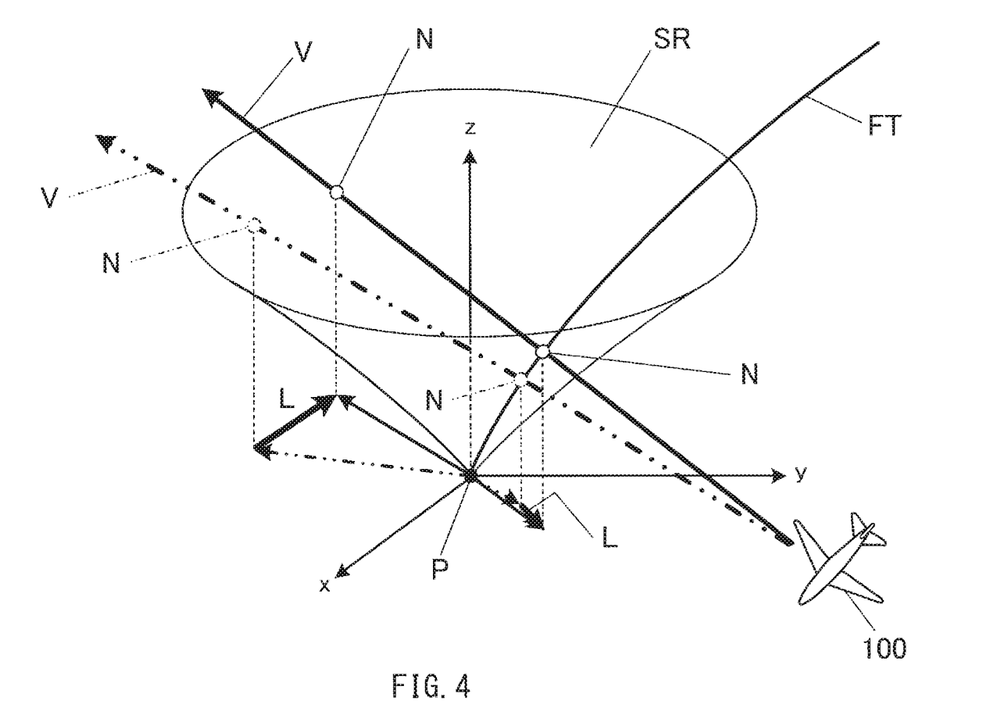
FIG. 4 describes an example of the flying object position measuring process according to one implementation of the technology.

FIG. 2 is a flowchart illustrating an example of a flow of the flying object position measuring process. FIGS. 3A, 3B, and 4 each describe an example of the flying object position measuring process. In each of FIGS. 3A, 3B, and 4, an xy plane indicates a horizontal plane, and a z-axis indicates a vertical axis.

The flying object position measuring process involves obtainment of an image of the flying object F by means of the optical sensor 13, and measurement, of the position of the flying object F, based on the obtained image. In one implementation, the position of the flying object F may include, for example but not limited to, an orientation of the flying object F as viewed from the aircraft 100 and a distance from the aircraft 100 to the flying object F. The flying object position measuring process may be executed on an example condition that an instruction to execute the flying object position measuring process is inputted. The input of the instruction may be performed through, for example but not limited to, an operation performed by a user, such as a pilot, of the aircraft 100. The execution of the flying object position measuring process may be performed by reading and loading, by the controller 18, of the flying object position measuring program 160 from the storage 16.

In one implementation, the flying object F launched from the start point P may be detected and captured from the aircraft 100 in flight, and the position of the flying object F may be measured from the aircraft 100 in flight.

As illustrated in FIGS. 2 and 3A by way of example, when the flying object position measuring process is executed, the controller 18 may first cause the optical sensor 13 to obtain the image of the flying object F, and cause the storage 16 to store obtained image (step S1).

Thereafter, the controller 18 may calculate an orientation vector V of the flying object F as viewed from the aircraft 100, specifically, as viewed from the optical sensor 13, on the basis of the obtained image information (step S2).

As used herein, the term "orientation vector" of the flying object F as viewed from the aircraft 100 may simply refer to an orientation of the flying object F as viewed from the aircraft 100, and is intended to exclude information regarding a distance from the aircraft 100 to the flying object F. Further, as used herein, the term "orientation" may encompass not only a bearing, i.e., a direction in the horizontal plane, but also a facing direction related to the vertical direction.

Thereafter, the controller 18 may calculate an intersection N of a plane of rotation SR with the orientation vector V of the flying object F (step S3), as illustrated in FIG. 3B by way of example. The plane of rotation SR may be a plane based on a rotation, of the basic trajectory FT of the flying object F, around a vertical axis that travels through the start point P.

Specifically, the controller 18 may calculate the plane of rotation SR on the basis of the trajectory data 161 read from the storage 16. The controller 18 may thereafter calculate the intersection N of the calculated plane of rotation SR with the orientation vector V calculated in step S2. FIGS. 3B and 4 each illustrate an example case in which the plane of rotation SR and the orientation vector V intersect with each other at two intersections N.

Thereafter, the controller 18 may determine whether two intersections N are obtained as a result of the calculation performed in step S3 (step S4).

In an unillustrated case where a determination is made that only single intersection N is obtained, i.e., where a determination is made that the orientation vector V touches the plane of rotation SR (step S4: NO), the controller 18 may set the obtained single intersection N as the position of the flying object F (step S5).

In contrast, when a determination is made in step S4 that two intersections N are obtained (step S4: YES), the controller 18 may set, as the position of the flying object F, one, of the two intersections N, that has a smaller shift amount of a projected image (step S6). The projected image may be an image, of the relevant intersection N, that is projected to the horizontal plane.

Specifically, as illustrated in FIG. 4 by way of example, the controller 18 may compare a current projected image of each of the two intersections N with a projected image, of the relevant intersection N, that is a predetermined number of calculation frames before. The projected image may be an image, of the relevant intersection N, that is projected to the horizontal plane. The projected image, of each of the intersections N, that is the predetermined number of calculation frames before is denoted by a symbol N lead by a dashed-two-dotted line in FIG. 4. Further, the controller 18 may calculate the shift amount L of the projected image of the relevant intersection N on the basis of the comparison. In one implementation, the shift amount L of the projected image of the intersection N may be, for example but not limited to, variation in position of the projected image of the intersection N over time. Thereafter, the controller 18 may set, as the position of the flying object F, one, of the two intersections N, that has a smaller shift amount L of the projected image. In the example case illustrated in FIG. 4, the intersection N closer to the aircraft 100 as viewed from the aircraft 100 corresponds to the one that has the smaller shift amount L of the projected image.

A description is given below in greater detail of selection of the position of the flying object F from the two intersections N.

Figure 5A:
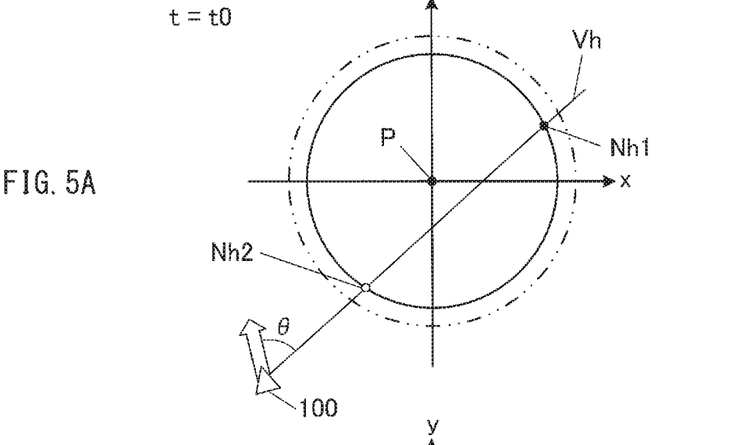
FIGS. 5A to 5C each describe an example of the flying object position measuring process according to one implementation of the technology.
Figure 5B:
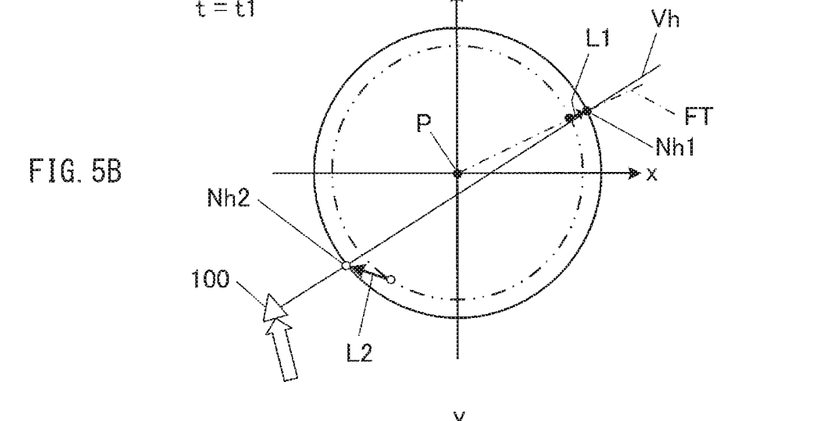
Figure 5C:
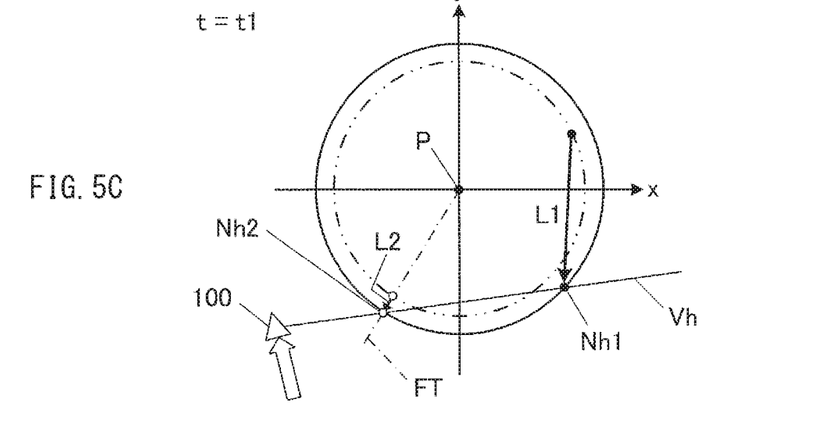

As illustrated in FIGS. 5A to 5C by way of example, consideration is given to the shift amount L of the projected image Nh of each of the two intersections N in a case where time t is elapsed from t0 to t1 (from t=t0 to t=t1). The projected image Nh of each of the two intersections N may refer to an image, of the relevant intersection N, projected to the horizontal plane, i.e., the xy plane. In this example, the projected image Nh of the two intersections N may include a projected image Nh1 farther from the aircraft 100 as viewed from the aircraft 100 and a projected image Nh2 closer to the aircraft 100 as viewed from the aircraft 100. In this example, when the time t is t0 (t=t0), the aircraft 100 is flying in a flight orientation that forms an angle θ with respect to a projected image Vh in the horizontal plane. The projected image Vh may be an image of the orientation vector V projected to the horizontal plane.

On this condition, when the projected image Nh1 farther from the aircraft 100 is true and the projected image Nh2 closer to the aircraft 100 is false, the projected image Nh1 moves along the basic trajectory FT. As a result, a shift amount L1 of the projected image Nh1 is smaller than a shift amount L2 of the projected image Nh2, as illustrated in FIG. 5B. As used herein, the wording "the projected image Nh is true" refers to that the projected image Nh corresponds to projection of the actual position of the flying object F, and the wording "the projected image Nh is false" refers to that the projected image Nh does not correspond to the projection of the actual position of the flying object F.

In contrast, when the projected image Nh2 closer to the aircraft 100 is true and the projected image Nh1 farther from the aircraft 100 is false, the projected image Nh2 moves along the basic trajectory FL As a result, the shift amount L2 of the projected image Nh2 is smaller than the shift amount L1 of the projected image Nh1, as illustrated in FIG. 5C.

As described above, even in both of the case where the projected image Nh farther from the aircraft 100, i.e., the projected image Nh1, is true and the case where the projected image Nh closer to the aircraft 100, i.e., the projected image Nh2, is true, the shift amount of the true projected image Nh is smaller than that of the false projected image Nh. A difference in shift amount between the two projected images Nh may be proportional to the angle θ formed between the projected image Vh of the orientation vector V and the flying orientation of the aircraft 100. Accordingly, in one implementation, the aircraft 100 may perform, for example but not limited to, circular flight so as not to continue linear flight in which the angle θ is 0 (zero) (θ=0).

After the position of the flying object F is set in step S5 or S6, the controller 18 may determine whether to end the flying object position measuring process (step S7). When a determination is made not to end the flying object position measuring process (step S7: NO), the controller 18 may cause the process to return to the foregoing step S1. In contrast, when a determination is made to end the flying object position measuring process on the basis of, for example but not limited to, reception of an end operation performed by the pilot (step S7: YES), the controller 18 may end the flying object position measuring process.

[Effects]

An existing technique of measuring a position of a flying object such as a rocket typically uses a radar device. Such a technique using the radar device, however, has a concern that a position of a person who performs the measurement is easily detected by others due to output of radio waves by the radar device.

To address the foregoing concern, for example, in a technique disclosed in JP-B No. 3001757, a plurality of pieces of possible trajectory data of a flying object are accumulated as a database. Further, a possible trajectory based on the possible trajectory data that most matches observation data based on observation by an optical sensor is selected as an estimated trajectory of the flying object. This technique makes it possible to estimate the trajectory of the flying object and capture the position of the flying object without using a device outputting radio waves such as a radar device.

In the technique disclosed in JP-B No. 3001757, however, the possible trajectory data that is closest to the observation data is selected from the plurality of pieces of the possible trajectory data. Therefore, it is necessary to accumulate a large quantity of possible trajectory data as the database, in order to achieve higher accuracy of measurement. Meanwhile, it is necessary to confirm a degree of matching with the observation data for every piece of the possible trajectory data. Therefore, a time period for calculating the degree of matching increases in accordance with an increase in number of pieces of the possible trajectory data directed to improvement in accuracy of the measurement. Further, there may be employed a method of measuring a distance to the flying object by means of adjustment of a focal point of an optical camera. In this method, however, an error in measurement may increase in a case where an object is relatively far from the optical camera, a case where an optical camera having a great depth of field is used, or any other case.

In contrast, according to one implementation of the technology, the orientation vector V of the flying object F as viewed from the optical sensor 13 is calculated on the basis of the image of the flying object F obtained by the optical sensor 13. Further, the position of the flying object F is calculated as the intersection N of the orientation vector V with the plane of rotation SR. The plane of rotation SR is the plane based on the rotation of the basic trajectory FT of the flying object F around the vertical axis traveling through the start point P.

This makes it possible to favorably measure the position of the flying object F on the basis of the image obtained by the optical sensor 13, without necessity of using a device, such as the radar device, that outputs radio waves. Further, unlike the existing techniques, this eliminates necessity of the database in which a large quantity of possible trajectory data is accumulated and necessity of the calculation that refers to every piece of the large quantity of data. Further, this makes it possible to measure the position of the flying object F with higher accuracy compared to that of the technique using the adjustment of the focal point of the optical camera.

Hence, it is possible to achieve highly-accurate measurement of the position of the flying object F with a simpler configuration, compared to the existing technique.

[Modification Examples]

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the example implementation described above, when the plane of rotation SR and the orientation vector V of the flying object F intersect with each other at two intersections N, one, of the two intersections N, that has the smaller shift amount L of the projected image is determined as the position of the flying object F. The projected image may be an image, of the relevant intersection N, that is projected to the horizontal plane. In an alternative implementation, however, the position of the flying object F may be selected from the two intersections N by any other method.

For example, in one implementation, any, of the two intersections N, that has one of an over-time speed falling within a predetermined threshold range and an over-time acceleration rate falling within a predetermined threshold range may be determined as the position of the flying object F. The over-time speed may be obtained on the basis of variation in position of the relevant intersection N over time. The over-time acceleration rate may be obtained on the basis of the variation in position of the relevant intersection N over time. This method is based on a determination as to whether any of a speed and an acceleration rate of the flying object F has a numerical value that is achievable by the science at present. In this method, when both of the two intersections N satisfy the foregoing condition, both of the two intersections N may be determined as the position of the flying object F. When none of the two intersections N satisfies the foregoing condition, the detection of the flying object F may be regarded as an error, and a result of the detection may be discarded.

In an alternative implementation, one, of the two intersections N, having a distance to the aircraft 100 that becomes shorter over time by a greater amount, i.e., one that is greater in speed at which the relevant intersection N approaches the aircraft 100, may be determined as the position of the flying object F. This is based on a way of thinking that the one with higher urgency in terms of a threat with respect to the aircraft 100 is to be selected.

It is to be noted that only one of the foregoing two methods of making a selection may be employed; however, in one implementation, both of the foregoing two methods may be employed for AND condition. Specifically, the intersection N that satisfies both of the foregoing conditions may be selected as the position of the flying object F. Further, one or both of the foregoing two methods of making a selection may be employed together with the method described in the foregoing implementation, i.e., the method based on the shift amount of the projected image of the intersection N.

Moreover, the flying object position measuring apparatus according to one implementation of the technology may be mounted on a mobile body other than the aircraft, or may be provided in an immovable facility on the ground, on the ocean, or at any other suitable location. Non-limiting examples of the mobile body other than the aircraft may include a vehicle and a vessel.

In an alternative implementation, only the optical sensor may be mounted on the mobile body, and the controller and any other unit may be provided in another mobile body or any other facility. In this implementation, the controller and any other unit may calculate the position of the flying object on the basis of the image information supplied from the mobile body.

The controller 18 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the controller 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 1.

The invention claimed is:

1. A flying object position measuring apparatus comprising:
   an optical sensor configured to obtain an image of a flying object, the flying object configured to perform flight along a ballistic trajectory;
   a storage that stores, in advance, a start point at which the flying object starts the flight and a basic trajectory of the flying object;
   an orientation calculator configured to calculate, on a basis of the image obtained by the optical sensor, a direction in which the flying object is seen from the optical sensor; and
   a position calculator configured to calculate, as a position of the flying object, an intersection of 1) the calculated direction in which the flying object is seen from the optical sensor and 2) a plane of rotation being a plane formed based on rotating the basic trajectory about a vertical axis, the vertical axis traveling through the start point.

2. The flying object position measuring apparatus according to claim 1, wherein, when two intersections are obtained as a result of the calculation of the intersection of the calculated direction and the plane of rotation, the position calculator determines, as the position of the flying object, one, of the two intersections, that has smaller variation in projected position over time, the projected position being a position of an image of the relevant one, of the two intersections, projected to a horizontal plane.

3. The flying object position measuring apparatus according to claim 2, wherein, when two intersections are obtained as a result of the calculation of the intersection of the calculated direction and the plane of rotation, the position calculator determines, as the position of the flying object, any, of the two intersections, that has one of an over-time speed falling within a predetermined threshold range and an over-time acceleration rate falling within a predetermined threshold range, the over-time speed being a speed based on variation in position of the relevant one, of the two intersections, over time, the over-time acceleration rate being an acceleration rate based on the variation in position of the relevant one, of the two intersections, over time.

4. The flying object position measuring apparatus according to claim 3, wherein, when two intersections are obtained as a result of the calculation of the intersection of the calculated direction and the plane of rotation, the position calculator determines, as the position of the flying object, one, of the two intersections, that is greater in speed at which the relevant one, of the two intersections, approaches the optical sensor.

5. The flying object position measuring apparatus according to claim 3, wherein the optical sensor is mounted on a mobile body.

6. The flying object position measuring apparatus according to claim 2, wherein, when two intersections are obtained as a result of the calculation of the intersection of the calculated direction and the plane of rotation, the position calculator determines, as the position of the flying object, one, of the two intersections, that is greater in speed at which the relevant one, of the two intersections, approaches the optical sensor.

7. The flying object position measuring apparatus according to claim 2, wherein the optical sensor is mounted on a mobile body.

8. The flying object position measuring apparatus according to claim 1, wherein, when two intersections are obtained as a result of the calculation of the intersection of the calculated direction and the plane of rotation, the position calculator determines, as the position of the flying object, any, of the two intersections, that has one of an over-time speed falling within a predetermined threshold range and an over-time acceleration rate falling within a predetermined threshold range, the over-time speed being a speed based on variation in position of the relevant one, of the two intersections, over time, the over-time acceleration rate being an acceleration rate based on the variation in position of the relevant one, of the two intersections, over time.

9. The flying object position measuring apparatus according to claim 8, wherein, when two intersections are obtained as a result of the calculation of the intersection of the calculated direction and the plane of rotation, the position calculator determines, as the position of the flying object, one, of the two intersections, that is greater in speed at which the relevant one, of the two intersections, approaches the optical sensor.

10. The flying object position measuring apparatus according to claim 1, wherein, when two intersections are obtained as a result of the calculation of the intersection of the calculated direction and the plane of rotation, the position calculator determines, as the position of the flying object, one, of the two intersections, that is greater in speed at which the relevant one, of the two intersections, approaches the optical sensor.

11. The flying object position measuring apparatus according to claim 8, wherein the optical sensor is mounted on a mobile body.

12. The flying object position measuring apparatus according to claim 1, wherein the optical sensor is mounted on a mobile body.

13. A flying object position measuring method comprising:
   calculating a direction in which a flying object is seen from an optical sensor on a basis of an image, of the flying object, obtained by the optical sensor, the flying object performing flight along a ballistic trajectory; and
   calculating, as a position of the flying object, an intersection 1) the calculated direction in which the flying object is seen from the optical sensor and 2) a plane of rotation being a plane formed based on rotating a basic trajectory of the flying object about a vertical axis, the vertical axis traveling through a start point, the start point being a point at which the flying object starts the flight.

14. A non-transitory storage medium containing a flying object position measuring program embodied therein, the flying object position measuring program causing, when executed by a computer, the computer to implement a method, the method comprising:
   calculating a direction in which a flying object is seen from an optical sensor on a basis of an image, of the flying object, obtained by the optical sensor, the flying object performing flight along a ballistic trajectory; and
   calculating, as a position of the flying object, an intersection of 1) the calculated direction in which the flying object is seen from the optical sensor and 2) a plane of rotation being a plane formed based on rotating a basic trajectory of the flying object about a vertical axis, the vertical axis traveling through a start point, the start point being a point at which the flying object starts the flight.

15. A flying object position measuring apparatus comprising:
- an optical sensor configured to obtain an image of a flying object, the flying object performing flight along a ballistic trajectory;
- a storage that stores, in advance, a basic trajectory of the flying object and a start point at which the flying object starts the flight; and
- circuitry configured to
    - calculate, on a basis of the image obtained by the optical sensor, a direction in which the flying object is seen from the optical sensor, and
    - calculate, as a position of the flying object, an intersection of 1) the calculated direction in which the flying object is seen from the optical sensor and 2) a plane of rotation being a plane formed based on rotating the basic trajectory about a vertical axis, the vertical axis traveling through the start point.

\* \* \* \* \*